July 21, 1959 W. R. KEARNEY 2,896,188

TERMINAL BOARD

Filed Sept. 27, 1956

INVENTOR.
William R. Kearney
BY
R. E. Fowler
ATTORNEY

United States Patent Office 2,896,188

Patented July 21, 1959

2,896,188

TERMINAL BOARD

William R. Kearney, Kokomo, Ind., assignor to General Motors Corporation, Detroit, Mich., a corporation of Delaware Application September 27, 1956, Serial No. 612,435

3 Claims. (Cl. 339—198)

This invention relates to means for supporting and holding conductive wiring for electrical assemblies or sub-assemblies which may form a part of a complete electric device.

In the fabrication of sub-assemblies or assemblies for complex electrical equipment, it is necessary to connect together electrically a plurality of components. Thus the terminals of one component will be connected to those of other elements or other ends of interconnecting wires extending around the apparatus. Making such multiple connections on an assembly is a tedious task requiring care. In most cases also the joints must furthermore be individually soldered and access to the same for soldering usually adds further complications.

It is therefore an object in making this invention to provide supporting means for an electrical assembly of parts having a special gripping or clamping section for holding conductors to be soldered in juxtaposition.

It is a further object in making this invention to provide a supporting means for an assembly of electrical parts having a plurality of frictional gripping sections to simultaneously lock various groups of wires together in a given locality where they can then be simultaneously dip soldered.

With these and other objects in view which will become apparent as the specification proceeds, this invention will be best understood by reference to the following specification and claims and the illustrations in the accompanying drawing in which:

Since automation is gradually working its way into the assembly of complex systems much thought has been devoted to speeding up the assembly of electrical components and sub-assemblies for mounting in complete systems. The location of soldered joints has in the past required painstaking care in soldering and the expenditure of an unwarranted amount of time. In an effort to save time in assembling electrical components of a sub-assembly, it is proposed to form all the joints in a given plane so that they may be dip-soldered simultaneously in one operation.

Figure 1:
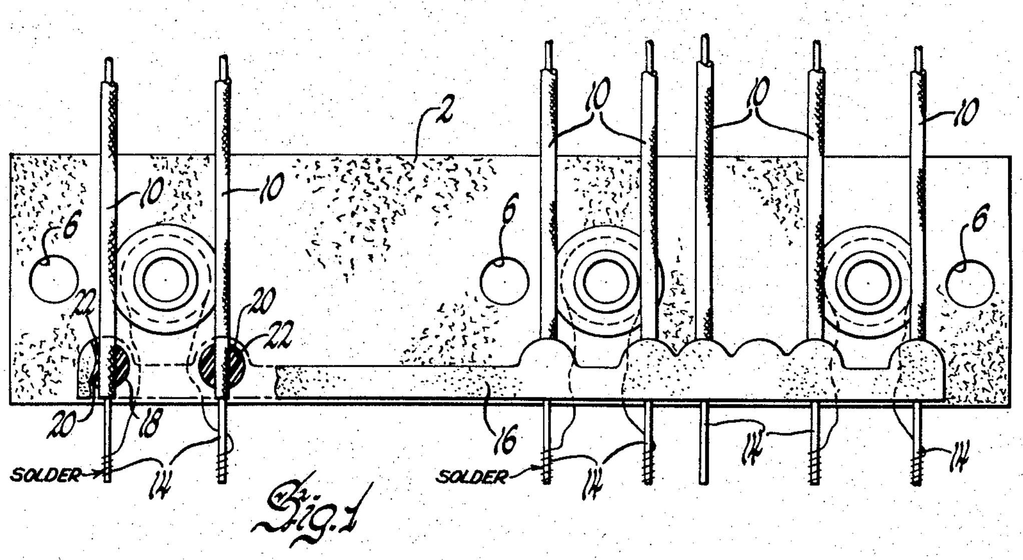
Figure 1 is a front elevational view of the supporting panel assembly embodying my invention.
Figure 2:
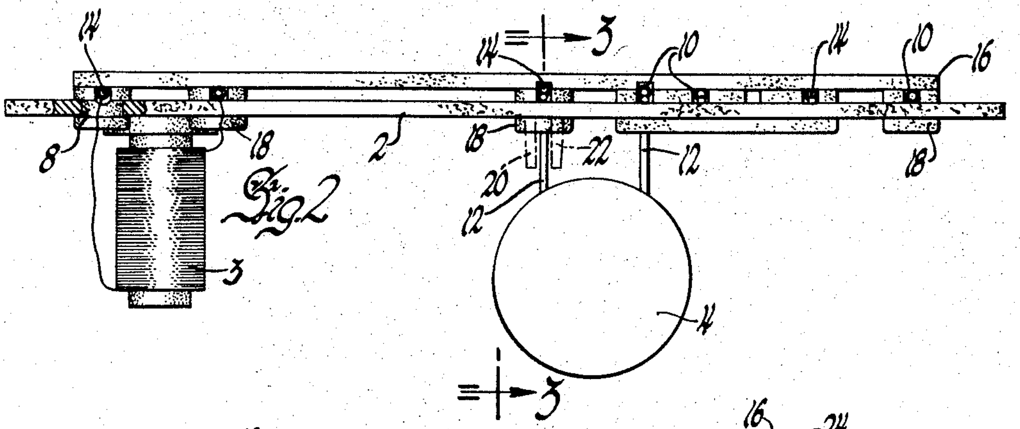
Figure 2 is a top plan view of the panel.

As an example only of certain equipment applicable to the use of my invention I have shown in Fig. 1, an insulating assembly panel 2 which is rectangular in shape. This panel supports in practice the inductance tuning coils of a radio receiver together with other associated components, which have to be connected through conductors to various parts of the receivers. The coils 3 are adapted to be mounted on the rear surface of the panel 2 as well as other components such for example as a condenser shown diagrammatically at 4. The panel 2 is provided with holes 6 through which suitable supporting bolts may be inserted for mounting or supporting components. Along one edge of the panel 2 there are provided a series of openings 8 across which certain conductors are supported to which it is desired to secure other conductive lines. Across these openings 8 there are laid a series of conductors 10 which are insulated. The leads 12 from the condenser 4 are brought up to the panel 2 and then through opening 8 to lie parallel with the extending and bared end 14 of the conductor 10. Thus line 12 and the bared end 14 have sufficient rigidity to extend outwardly, are parallel and lie together in each case and may then be dip soldered simultaneously.

Figure 3:
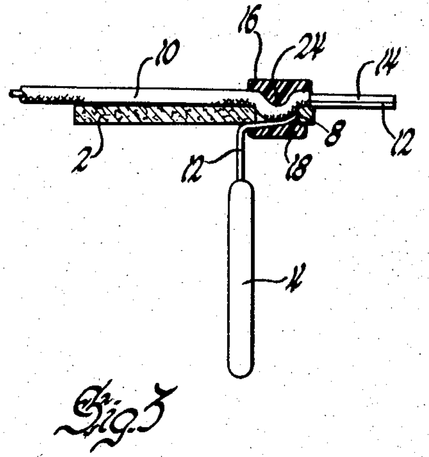
Figure 3 is a sectional view taken on line 3—3 of Fig. 2.
Figure 4:
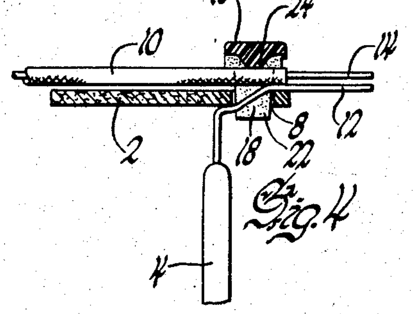
Figure 4 is a sectional view similar to Fig. 3 but showing the parts in partially assembled position.

To clamp the conductor 10 and the lead 12 in the opening 8, as best shown in Fig. 3, there is provided an elongated clamping bar 16 formed of electrical insulating material such as plastic and having on one surface a plurality of integral split rivet sections 18 which are adapted to align with the various openings 8 in the panel 2. The split in each rivet permits the two opposite sides 20 and 22 to project down around the two wires and hold them in the center of the slot. In pushing downwardly on the bar and rivets, the inside slot in the rivet has a central protrusion 24 which presses down on the wires to hold them in place. This best shown in Figs. 3 and 4, Fig. 4 illustrating the partial application of the split rivet bar before deformation of any of the wires, and Fig. 3 showing the rivet after it has been pushed into place and the lower ends of numbers 20 and 22 heated and deformed to rivet them in place.

In assembling this equipment therefore, the substantially stiff leads from the electrical components such as condensers 4 are led up through adjacent openings 8 in one side of the panel. The conductors 10 which are sufficiently stiff to be self-supporting and to which the leads are to be soldered are laid across the openings in each case and then the rivet supporting bar which may be a plastic is pressed down to lock each plurality of wires in its opening and, lastly, the bottom portions of the rivets are heated and deformed to seal the assembly. The sub-assembly is then taken to a supply of molten solder and the self-supporting and projecting ends of the wires dipped in to solder all the joints simultaneously.

In some instances the leads 7 from the electrical components such as the tuning coils 3 are of very fine wire and have insufficient stiffness to be self-supporting. In that case the ends 14 of conductors 10 are utilized as terminals to support the fine wire leads 7 from the coils. Such fine leads are not brought through the openings 8 as are leads 12 but only the conductor 10 is clamped across the opening by the rivet bar 16. The fine lead 7 from the coil supported by the panel 2 is brought from the rear of the panel 2 around the edge and wound around the end 14 which supports it. Later, when the assembly is dip soldered as before, the end 14 supports the fine lead as it is soldered to it.

This construction provides a very fast assembly of parts and produces satisfactory commercial soldered joints with ease.

I claim:

1. In electrical equipment, an insulating panel for supporting electrical equipment having leads, a plurality of conductive lines to be connected to said leads, said panel having a plurality of openings in a row adjacent one edge across each of which a lead and associated line, which are adapted to be connected thereto, are placed and extend beyond said edge and a unitary clamping bar of insulating material having clamping projections located in the same configuration as the openings in the panel, each said clamping projection including spaced legs and adapted when assembled to project through each opening and hold the lead and line between them so that the leads and lines can be soldered together simultaneously by a single solder dip.

2. In electrical equipment, an insulating panel for supporting electrical equipment having leads, a plurality of conductive lines to be connected to said leads, said panel having a plurality of openings therein across which each lead and associated line, which are adapted to be connected thereto, are placed and a unitary clamping bar of insulating material having clamping projections located in the same configuration as the openings in the panel assembled on said panel, each said clamping projection including spaced legs to project through each opening on opposite sides of the lead and line when assembled and hold the lead and line clamped between them, said projections being deformable after they have been inserted in each opening to flow and to clamp the assembly together and hold the leads and lines in juxtaposition.

3. In electrical equipment, an insulating panel for supporting electrical equipment having leads, a plurality of conductive lines to be connected to said leads, said panel having a plurality of openings therein across which each lead and associated line, which are adapted to be connected thereto, are placed and a unitary clamping bar of insulating material having clamping projections located in the same configuration as the openings in the panel assembled on said panel, each said clamping projection including spaced legs to project through each opening on opposite sides of each lead and line and hold the lead and line between them in assembled position, and a protruding portion between said spaced legs extending down into the opening when the clamping bar is pressed into place to force the leads and lines down into each opening for clamping.

References Cited in the file of this patent

UNITED STATES PATENTS

| | | |
|---|---|---|
| 1,149,599 | Small | Aug. 10, 1915 |
| 1,333,182 | Minor et al. | Mar. 9, 1920 |
| 1,559,668 | Brown et al. | Nov. 3, 1925 |
| 1,752,662 | Eckstein | Apr. 1, 1930 |
| 1,953,966 | Lynch | Apr. 10, 1934 |
| 2,441,393 | Buchanan et al. | May 11, 1948 |
| 2,462,127 | Pheazey et al. | Feb. 22, 1949 |
| 2,596,237 | Gross et al. | May 13, 1952 |
| 2,633,481 | Meeks | Mar. 31, 1953 |
| 2,673,968 | Smith | Mar. 30, 1954 |
| 2,699,133 | Ames et al. | Jan. 11, 1955 |